June 20, 1967 R. C. GRIMMER 3,327,131

CURRENT CONTROL SYSTEM

Filed Dec. 29, 1961

INVENTOR.
ROBERT C. GRIMMER

BY

Ralph R. Barnard
ATTORNEY

United States Patent Office 3,327,131

Patented June 20, 1967

3,327,131

CURRENT CONTROL SYSTEM

Robert C. Grimmer, Apalachin, N.Y., assignor to International Business Machines Corporation, New York, N.Y., a corporation of New York Filed Dec. 29, 1961, Ser. No. 163,326
2 Claims. (Cl. 307—88.5)

This invention relates to electrical circuits and more particularly to a new and improved backward diode constant current circuit for use in electrical circuits.

In electrical circuits used for both large and small signal systems there has always been a need for a circuit arrangement for passing a constant current over a wide range of voltage levels within that circuit. In recent years there has been developed a circuit element known as the backward diode. It is known as a backward diode because it is designed to pass a current therethrough when it is being reversely biased by a voltage. The current passing therethrough as a result of this reverse bias is a typical linear function of the magnitude of the reverse bias voltage. On the other hand, when the backward diode is forward biased it allows only a very small substantially constant current to pass therethrough over a wide range of forward biasing voltage supplied thereto.

In the past, designers have purposely tried to select backward diodes in which the constant current passing therethrough during forward biasing was maintained to a minimum. The reason for this is that when the backward diode is used as a unidirectional device this current is considered as undesirable. Meanwhile, other persons working in the field have designed backward diodes where this constant current may be of comparatively substantial magnitude. Moreover, the forward biasing voltage range over which this constant current is maintained has been increased by the proper selection of the type of material for making the backward diode. For example, a germanium backward diode will have one range; a silicon backward diode will have another increased range; a gallium-arsenide backward diode will have an even greater range. The magnitude of the constant current of the forwardly biased backward diodes utilizing each of these materials can be increased by proper doping.

It is one of the teachings of the present invention that since backward diodes are now avialable which have constant current characteristics of a relatively substantial constant current amplitude over a voltage range applied thereacross, the backward diode now provides a practical device for use in electrical circuitry to obtain constant current operation as required by a particular practical application. A semiconductor biased for operation as either a large signal switching device or a small signal amplifying device has a substantial engineering design requirement for the use of a backward diode in a manner which will provide for the passage of constant current over a range of voltages applied thereacross. For example, in the semiconductor circuit biased for circuit operation as a large signal switching device, the proper utilization of a backward diode, according to the teachings of the present invention, can provide for improved compensation for a collector leakage current which varies as a function of temperature. Similarly in a semiconductor circuit in which the semiconductor is biased for small AC signal amplification, the backward diode has application according to the teachings of the present invention to improve the stability factor of the DC operation point not withstanding the variation of collector leakage current or other circuit parameters such as changes in semiconductor device current gain or the variation in current gain between semiconductor devices inserted into the same circuit.

It is therefore the primary object of the present invention to provide a new and improved backward diode constant current circuit for use in electrical circuits.

It is another object of the present invention to provide a new and improved backward diode constant current circuits operating over a range of voltage levels thereacross in semiconductor circuits.

It is another object of the present invention to provide a new and improved backward diode constant current circuit in a large signal switching semiconductor circuit.

It is still another object of the present invention to provide a new and improved backward diode constant current circuit in a small signal AC semiconductor amplifier circuit.

The objects of the present invention are provided by forming a series circuit of a variable current source and a backward diode to obtain a constant current in that series circuit over a range of voltage levels across the diode. This is accomplished by orienting the backward diode so as to pass the current from the source in its forward direction and especially selecting the backward diode to obtain the desired current level over the desired range of voltage levels applied thereto.

The foregoing and other objects, features and advantages of the invention will be apparent from the following more particular description of preferred embodiments of the invention, as illustrated in the accompanying drawings.

Figure 1:
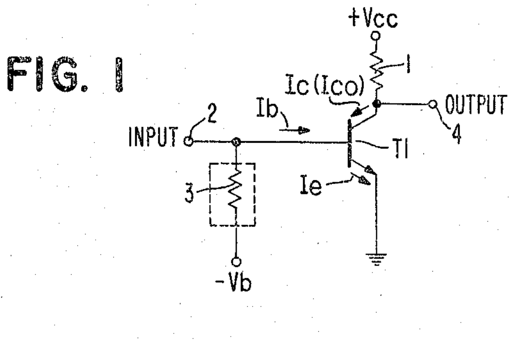
FIGURE 1 shows a semiconductor biased for a large signal switching application in accordance with the prior art.

The circuit shown in FIGURE 1 illustrates a typical biasing arrangement of a semiconductor for operation as a large signal switching device. Voltage source $+V_{cc}$ provides a biasing to the collector of semiconductor T1 via collector load resistor 1. The emitter of semiconductor T1 is connected directly to ground. Assuming the semiconductor T1 to be of the NPN type, as shown, with no input signal being applied to input terminal 2, the collector-base junction is reverse biased and the base-emitter junction is slightly forward biased or reverse biased corresponding to a possible conduction condition for T1. However, if $V_b$, resistor 3 and T1 are carefully selected, the base-emitter voltage $V_{be}$ may be below the conduction threshold voltage associated with a substantial base current $I_b$ (see FIGURE 3), and T1 will remain in a non-conduction condition corresponding to the large signal open switch condition. Because the semiconductor T1 does not have a substantial base current $I_b$, the collector current $I_c$ will consist of merely the reverse bias leakage current $I_{co}$. Under these conditions, output terminal 4 remains at a high voltage level near the $+V_{cc}$ level.

On the other hand, when a voltage is supplied to input terminal 2 such that the base-emitter voltage $V_{be}$ exceeds the threshold shown in FIGURE 1, the base current increases substantially and a substantial collector current $I_c$ is present. In the configuration shown in FIGURE 1 much of the collector current $I_c$ passes through the emitter giving a substantial current gain for the switch circuit. Also, output terminal 4 decreases toward the ground voltage level indicating a closed switch condition. The switch circuit as shown in FIGURE 1 is relatively easy to design for environments where there are no temperature variations or circuit parameter variations.

However, if during the aforementioned large signal open switch condition (when T1 is in its non-conducting condition) there is a large increase in the temperature the collector leakage current I*co* may increase substantially. If during the open switch condition, the base-emitter junction represents the only path for this increased leakage current I*co*, the base-emitter junction current I*e* may increase beyond the emitter voltage threshold V*be* of FIGURE 3 thereby effectively switching T1 to its conducting condition. Such a situation, of course, detracts from the capability of T1 in the configuration of FIGURE 1 to properly operate as a switch in environments in which substantial temperature variations are expected.

In the prior art, it has been the practice to provide an alternate path for the leakage current I*co* during the open switch condition so that this current will not pass through the base-emitter junction and cause V*be* to exceed the threshold shown in FIGURE 1. Designers approach this problem by determining the maximum I*co* which will be present in the collector of T1, at the maximum operating temperatures. An additional path such as that shown by resistor 3 of FIGURE 1 is used for the purpose of passing this leakage current. Until the base-emitter voltage threshold V*be* is exceeded, the resistance of the base-emitter junction is very high as shown by the slope in FIGURE 3. Assuming that the remote terminal of resistor 3 is grounded (instead of being connected to a voltage source —V*b*, as shown), a voltage is selected which is just below that corresponding to the emitter threshold V*be* of FIGURE 3 and the proper resistance for resistor 3 may be calculated for passing I*co* at its maximum value. Even though the maximum threshold V*be* is used for the calculation of the value of resistor 3, it is relatively small. Therefore, when a signal is applied to input terminal 2 and the base-emitter junction of T1 is driven to a relatively high voltage V*be* (on) corresponding to an "On" condition, this relatively small resistance value for resistor 3 causes that resistor path to pass a considerable amount of current far in excess of its current level during the "Off" switch condition of T1 thereby reducing the overall current gain of the circuit of FIGURE 1.

To overcome this problem, the circuit designers have connected resistor 3 to a voltage level —V*b* instead of ground. This increased voltage drop across resistor 3 allows the designer to pass substantially the same current through resistor 3 during both the "Off" switch condition (non-conduction of T1) and the "On" switch condition, while at the same time selecting that circuit to correspond to the maximum I*co*. However, this requires that the resistance of resistor 3 be substantially larger than in the prior art technique described hereinabove. Resistor 3 may be selected to have a negative temperature coefficient so that the current passed therethrough would be reduced in accordance with the decrease in I*co* with decreasing temperature.

Figure 3:
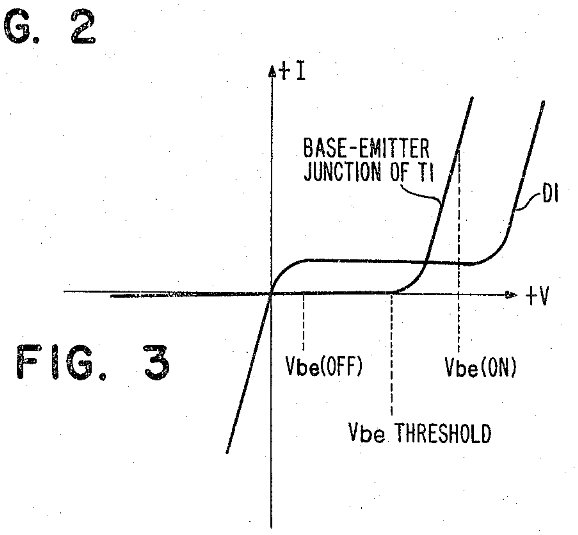
FIGURE 3 shows the superimposed current-voltage characteristics for both the emitter junction of a semiconductor device and the junction of the backward diode for the purpose of illustrating the teachings of the present invention as applied to large signal switching type semiconductor circuits.

In summary, the prior art techniques have substantial shortcomings whether the remote terminal of resistor 3 is maintained at a —V*b* bias level or grounded (commoned with the emitter). The grounding of the biasing resistor 3 led to substantial losses of current amplification during the closed switch condition (T1 conducting). The use of the bias voltage —V*b* requires an extra supply voltage. The use of the —V*b* source increased the resistance of requirements of resistor 3 (which has definite disadvantages when many of the known microminiaturization techniques are used). Finally, both of the techniques made it desirable to initially bias T1 in its switch "off" condition just under its emitter voltage threshold V*be* as shown in FIGURE 3 so that the resistance path could adequately handle the maximum I*co* with a minimum change in the current level therethrough. Under these conditions, any noise which appeared at input terminal 2 might easily cause the base-emitter junction voltage V*be* to exceed the threshold and partially turn T1 to its conducting condition. This had definite operational disadvantages in switching circuits.

Figure 2:
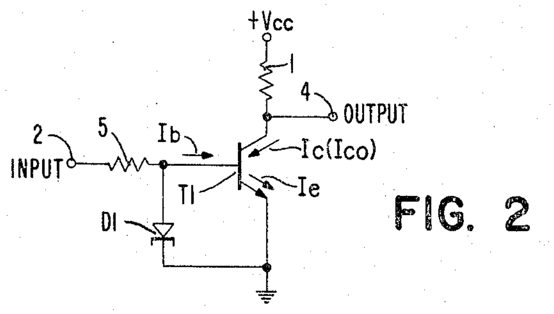
FIGURE 2 shows a semiconductor biased for a large signal switching operation in accordance with the teachings of the present invention.

In view of the foregoing problems, the teachings of the present invention involve connecting the base T1 directly to ground via a forwardly oriented backward diode as shown in FIGURE 2. Accordingly, when, as in FIGURE 1, T1 is biased to be in a nonconducting condition corresponding to an open switch and in the absence of an input signal at terminal 2 the variable current source represented by a variable I*co* appearing in the base via the collector may be passed directly to ground through the forwardly biased backward diode D1.

The backward diode D1 is properly selected so that the leakage current I*co* of T1 during the "Off" condition (non-conducting) is exactly equal to the constant current of the backward diode when forwardly biased by the voltage level existing on the base of T1. It has been noted that the constant current level of the backward diode does increase slightly with temperature. With this in mind, the current level of the backward diode and its variation with temperature may be matched with the variation of I*co* with temperature. Because the voltage level on the base of T1 of FIGURE 2 during its "Off" condition need not be determined by the requirement that a conduction path for I*co* be provided through a resistor, that voltage level can be selected to be considerably lower than the emitter threshold V*be* shown in FIGURE 3. Therefore, noise voltages of relatively small amplitude applied to terminal 2 of FIGURE 2 will not tend to switch T1 to its conduction condition.

Moreover, the backward diode D1 will provide a constant current path over a range of voltage levels applied to the base-emitter junction. The range of voltage levels through which the backward diode must provide this characteristic need only exceed the range of base-emitter voltage levels V*be* represented by the "Off" and "On" switch conditions of T1. This relationship is shown in FIGURE 3.

Accordingly, the teachings of the present invention greatly simplify the design problems for semiconductors biased for large signal switch type operation. It is emphasized that the semiconductor switch of FIGURE 2 forms the basic sub-circuit for most of the active element circuits in digital computers. Accordingly, when circuits such as FIGURE 2 are utilized to form triggers, inverters, latches, shift registers, etc., the teachings of the present invention may be applied.

Figure 4:
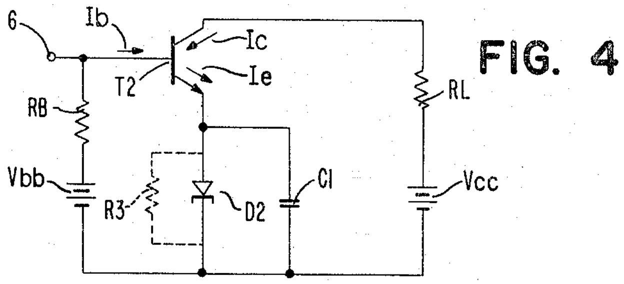
FIGURE 4 shows a semiconductor circuit biased for small AC signal amplification in accordance with the teachings of the present invention.

As suggested herein above the teachings of the present invention are not limited to the type of electrical circuits shown in FIGURE 2 but have application in other circuits as exemplified by FIGURE 4. FIGURE 4 shows a conventional grounded emitter circuit using current feedback for stabilization. This circuit functions as an AC small signal amplifier. This circuit is exactly the same as that shown in FIGURE 11–3, page 275 of a text book entitled "Transistor Physics and Circuits," by Riddle and Ristenbatt, Prentice Hall, Inc., 1958,, with the exception that a current feedback resistor R3 is replaced by a backward diode D2 according to the teachings of the present invention. Biasing voltage sources V*cc* and V*bb* in conjunction with the resistors R*b* and RL and the infinite impedance of backward diode D2 bias transistor T2 at an operating point appropriate for small signal AC amplification. Assuming that the backward diode D2 is replaced by a resistor R3 shown in dotted form (in accordance with the prior art), variations of the temperature environment of the circuit will cause the I*co* component of collector current I*c* to increase. The emitter current I*e* will increase correspondingly in turn increasing the collector current I*c* by reason of the current gain of the circuit configuration of FIGURE 4. This results in the circuit having an instability which may be represented by the following equation:

$$S=\frac{\Delta Ic}{\Delta Ico}=\frac{1}{1+hfe-hfe\ R3/R3+Rb} \quad (1)$$

where S is a measure of stability, $\Delta Ic$ is the incremental change in the collector current resulting from the effect of an incremental change of its component, $\Delta Ico$, by reason of the current gain *hfe* of the semicoductor circuit configuration.

In the prior art, designers have improved the stability of the circuit represented by Equation 1 above by increasing the value of resistance R3 and decreasing the value of resistance R*b*. By inspection of FIGURE 4 it can be seen that there are practical limitations on the size of R3 as well as the resistance of R*b*. For example, if resistance R*b* is made too small it has a shunting effect on the signal being applied to terminal 6. On the other hand, if as according to the teachings of the present invention, a backward diode D2 is selected to have a level of current within its constant current range as shown in FIGURE 3 commensurate with the emitter current I*e* when T2 is biased at its operating point, variations of collector current I*c* by reason of variations in its I*co* component because of temperature will not change the emitter current I*e* or the operating point of T2. Stated another way, if the characteristic infinite impedance of the backward diode over its constant current range is substituted for R3 in Equation 1 to describe a stability factor, the resulting stability factor, S, for FIGURE 4 approaches 1.

FIGURE 4, as well as FIGURE 2, shows an application where a forwardly biased backward diode is utilized with a variable current source so as to obtain a constant current in a series circuit formed thereby. Those skilled in the art of designing electrical circuitry will be able to utilize the teachings of the present invention to obtain improved engineering results in many other circuit applications. The only limitation on the teachings of the present invention is that a backward diode be available for selection with a desired constant current characteristic over the range of voltage levels thereacross required for the practical application.

While the invention has been particularly shown and described with reference to preferred embodiments thereof, it will be understood by those skilled in the art that various changes in form and details may be made therein without departing from the spirit and scope of the invention.

What is claimed is:

1. A semiconductor circuit comprising: a semiconductor having a collector element, a base element and an emitter element, said semiconductor being biased for operation as a switching device characterized by a nonconducting condition and a conducting condition;

a backward diode connected in parallel with the junction between the base and emitter elements to pass therethrough a constant current over a range of voltage levels thereacross at least including the range of the base emitter junction voltage of said semiconductor during both its nonconducting and conducting states, said backward diode being selected to have a constant current level to include the maximum collector leakage current passing through the collector base junction of said semiconductor during a selected temperature range of operation, said constant current and said range of voltage levels being equal to the constant current and related range of voltages of the static characteristic curve of the selected said backward diode.

2. A semiconductor circuit comprising: a semiconductor having a collector element, a base element and an emitter element, said semiconductor being biased for operation as a switching device characterized by a nonconducting condition and a conducting condition;

a backward diode connected in parallel with the junction between the base and emitter elements to pass therethrough a constant current over a range of voltage levels thereacross at least including the range of the base emitter junction voltage of said semiconductor during both its nonconducting and conducting states, said constant current and said range of voltage levels being equal to the constant current and related range of voltages of the static characteristic curve of the selected said backward diode.

References Cited

UNITED STATES PATENTS

| | | | |
|---|---|---|---|
| 3,073,969 | 1/1963 | Skillen | 307—88.5 |
| 3,090,926 | 5/1963 | Engel | 330—40 X |
| 3,136,928 | 6/1963 | Avis | 330—18 X |
| 3,107,309 | 10/1963 | Hitt | 307—88.5 |
| 3,235,746 | 2/1966 | Karnaugh | 307—88.5 |
| 3,280,338 | 10/1966 | Lin et al. | 307—88.5 |

OTHER REFERENCES

Electronic Industries, Sept. 1960 (page 231 relied upon).

IBM Technical Disclosure Bulletin, vol. 4, No. 2, July 1961, "Transistor Tunnel Diode Inverter," by J. R. Turnbull, Jr.

General Electric "Tunnel Diode Manual," contributors H. R. Lowry et al., First edition, edited by Semiconductor Products Dept., Advertising and Sales Promotoion G. E. Co., Liverpool, N.Y.

Solid State Circuits Conference Digest of Technical Papers, Feb. 16, 1961, "KMC Planer Transistors in Microwatt Logic, Circuitry," by Allison et al., pages 62 and 63.

University of Illinois Graduate College Digital Computer Laboratory, "Applications of Tunnel Diodes In Switching Circuits," by Toshiro Kunihiro, October 26, 1960 (pages 47 and 48 relied on).

ARTHUR GAUSS, *Primary Examiner.*

JOHN W. HUCKERT, *Examiner.*

J. JORDAN, *Assistant Examiner.*